(12) United States Patent
Helkey et al.

(10) Patent No.: US 6,449,098 B1
(45) Date of Patent: Sep. 10, 2002

(54) HIGH UNIFORMITY LENS ARRAYS HAVING LENS CORRECTION AND METHODS FOR FABRICATING THE SAME

(75) Inventors: Roger Jonathan Helkey, Montecito; Noel MacDonald, Santa Barbara, both of CA (US)

(73) Assignee: Calient Networks, Inc., Goleta, CA (US)

(*) Notice: Subject to any disclaimer, the term of this patent is extended or adjusted under 35 U.S.C. 154(b) by 0 days.

(21) Appl. No.: 09/572,922

(22) Filed: May 16, 2000

(51) Int. Cl.[7] .............................................. G02B 27/10
(52) U.S. Cl. ........................ 359/619; 359/621; 359/622
(58) Field of Search ................................ 359/619, 621, 359/622, 625, 626

(56) References Cited

U.S. PATENT DOCUMENTS

| | | | |
|---|---|---|---|
| 3,492,484 A | 1/1970 | Iti ................................ 359/117 |
| 3,649,105 A | 3/1972 | Treuthart ..................... 359/222 |
| 4,179,183 A | 12/1979 | Tateoka et al. ............. 359/206 |
| 4,421,381 A | 12/1983 | Ueda et al. ................... 350/6.6 |
| 4,574,191 A | 3/1986 | Conrad ..................... 250/203.1 |
| 4,598,585 A | 7/1986 | Boxenhorn .................. 73/505 |
| 4,654,663 A | 3/1987 | Alsenz et al. ............ 340/870.3 |
| 4,696,062 A | 9/1987 | LaBudde ..................... 359/159 |
| 4,696,545 A | * 9/1987 | Lama .......................... 359/626 |
| 4,834,484 A | 5/1989 | Gorman et al. ............... 385/26 |
| 4,834,485 A | 5/1989 | Lee ............................. 359/114 |
| 4,838,637 A | 6/1989 | Torok et al. .................. 385/34 |
| 4,859,012 A | 8/1989 | Cohn ........................... 385/17 |
| 4,875,756 A | 10/1989 | Estes et al. ................. 359/154 |
| 4,886,331 A | 12/1989 | Peterson ....................... 385/16 |
| 4,922,756 A | 5/1990 | Henrion ..................... 73/517 R |
| 4,923,269 A | 5/1990 | Healey ....................... 349/196 |
| 4,993,796 A | 2/1991 | Kapany et al. ............. 359/127 |
| 5,016,072 A | 5/1991 | Greiff .......................... 357/26 |
| 5,077,622 A | * 12/1991 | Lynch ......................... 359/813 |
| 5,083,857 A | 1/1992 | Hornbeck .................... 359/291 |
| 5,097,354 A | 3/1992 | Goto ........................... 359/212 |

(List continued on next page.)

FOREIGN PATENT DOCUMENTS

| | | |
|---|---|---|
| GB | 2175705 A | 12/1986 |
| JP | 60-107017 | 6/1985 |
| JP | 5-107485 A | 4/1993 |
| JP | Hei 6-180428 | 6/1994 |

OTHER PUBLICATIONS

Mihailovich, Zhang, Shaw, MacDonald, "Single–Crystal Silicon Torsional Resonators", 0–7803–0957–2/93, 1993 IEEE, p. 184–188.

Ming C. Wu, "MEMS for Optical and RF Applications." UCLA Extension, Department of Engineering, Information Systems and Technical Management, Engineering: 823.52, Nov. 1–3, 1999.

M.C. Wu, L.–Y Lin, S.–S. Lee, and K.S.J. Pister, "Micromachined Free–Space Integrated Micro–Optics," Sensors and Actuators A, 50, pp. 127–134 (1995).

Joseph E. Ford, Vladimir A. Aksyuk, David J. Bishop, and James A. Walker, "Wavelength Add–Drop Switching Using Tilting Micromirrors," Journal of Lightwave Technology, vol. 17, No. 5, pp. 904–911 (May 1999).

*Primary Examiner*—Georgia Epps
*Assistant Examiner*—Gary O'Neill
(74) *Attorney, Agent, or Firm*—Blakely, Sokoloff, Taylor & Zafman LLP

(57) ABSTRACT

Uniformity errors for a lens array are corrected using corrective measures. The lens array includes a substrate. A plurality of primary lenses are formed from the substrate. A corrective measure is formed for each primary lens having a uniformity error such that the corrective measure corrects the uniformity error. Furthermore, a plurality of primary lenses are formed from a first side of a substrate. A uniformity of the plurality of primary lenses are measured. A corrective measure is formed for each primary lens having a uniformity error based on the measured uniformity such that the corrective measure corrects the uniformity error.

29 Claims, 11 Drawing Sheets

U.S. PATENT DOCUMENTS

| | | | |
|---|---|---|---|
| 5,172,262 A | 12/1992 | Hornbeck | 359/223 |
| 5,203,208 A | 4/1993 | Bernstein | 73/505 |
| 5,226,321 A | 7/1993 | Varnham et al. | 73/505 |
| 5,440,654 A | 8/1995 | Lambert, Jr. | 385/17 |
| 5,450,245 A | 9/1995 | Grotzinger et al. | 359/822 |
| 5,488,862 A | 2/1996 | Neukermans et al. | 73/504.02 |
| 5,524,153 A | 6/1996 | Laor | 385/16 |
| 5,536,988 A | 7/1996 | Zhang et al. | 310/309 |
| 5,627,669 A | 5/1997 | Orino et al. | 359/156 |
| 5,629,790 A | 5/1997 | Neukermans et al. | 359/198 |
| 5,647,033 A | 7/1997 | Laughlin | 385/16 |
| 5,673,139 A | 9/1997 | Johnson | 359/291 |
| 5,822,125 A * | 10/1998 | Meyers | 359/621 |
| 5,920,417 A | 7/1999 | Johnson | 359/223 |
| 6,000,280 A | 12/1999 | Miller et al. | 73/105 |
| 6,002,818 A | 12/1999 | Fatehi et al. | 385/17 |
| 6,046,859 A * | 4/2000 | Raj | 359/649 |
| 6,097,858 A | 8/2000 | Laor | 385/16 |
| 6,097,859 A | 8/2000 | Solgaard et al. | 385/17 |
| 6,097,860 A | 8/2000 | Laor | 385/17 |
| 6,101,299 A | 8/2000 | Laor | 385/16 |
| 6,208,469 B1 * | 3/2001 | Matsuura | 359/637 |
| 6,222,679 B1 * | 4/2001 | Nevis | 359/641 |

* cited by examiner

HIGH UNIFORMITY LENS ARRAYS HAVING LENS CORRECTION AND METHODS FOR FABRICATING THE SAME

FIELD OF THE INVENTION

The present invention pertains to the field of optical switching and fiber optics. The present invention relates to optical switching devices and fiber optic components. More particularly, the present invention relates to high uniformity lens arrays having lens correction and methods for fabricating the same.

BACKGROUND OF THE INVENTION

An optical switching device couples light beams from an input fiber to an output fiber. In many optical switching systems, the light beams represent data in digital form. Typically, light beams form an input fiber are collimated and directed toward a desired location such as an output fiber. Lens arrays are used to collimate and direct beams of light to a desired location for optical switching devices. For example, lens arrays may be used to focus collimated beams of light to a mirror device, which redirects the beams of light.

FIG. 1 depicts an illustration 100 of a prior art lens array 104 outputting collimated light beams 108. Lens array 104 receives light beams outputted form fiber input block 102 through fibers 106. Light beams from fibers 106 are directed to corresponding lenses 104A of lens array 104. Lenses 104A collimate the beams of light. Lenses 104A may also focus the beams of light to a location based on the curvature and position of lenses 104A for lens array 104. Furthermore, the position of fibers 106 with respect to lenses 104A also affect the manner in which lenses 104A collimate and focus light beams.

A problem associated with prior art lens array 104 is uniformity. That is, if lenses 104A are not formed uniformly for lens array 104, collimated light beams 108 may not be collimated or focused correctly. For example, a small error in position of lenses 104A on the order of 1 $\mu m$ may cause significant focal angle or position error for a light beam. As shown in FIG. 1, if one of the lenses for lens array 104 is positioned incorrectly relative to the corresponding input fiber, light beams will enter the lens off center and, thusly, be directed at an improper angle and location that may cause data loss in some switching systems.

Furthermore, a small error in the shape or curvature lenses 104A for lens array 104 may affect the focal distance for light beams passing through the lens. As a result, the light beams may not be collimated and may converge or diverge thereby causing undesirable results. For a large optical switch, the distances that light beams must travel become large and thus the parameters for focal position and focal distance become tight.

Uniformity is also necessary for the position and curvature of the lens array 104 with respect to the fibers 106 when the collimated light beams 108 of FIG. 1 are incident on the lens array 104 and focused onto an output fiber. That is, an error in relative position of a lens and an input fiber may cause the light beam passing through the lens to be focused off center, which reduces coupling of optical power into an output fiber and increases loss. Furthermore, an error in curvature of the lens causes light to be focused in front or past the end of a fiber, which also reduces coupling of optical power into the fiber and increases loss.

Typically, for such error in the prior art lens array, the error tolerance is either accepted or the error is corrected by remaking the lens array with precise control of the lens fabrication. Thus, a disadvantage in the prior art is that error tolerances may not be acceptable for ultra-low-loss optical switches. Furthermore, to fix the error of a single lens for a lens array by remaking the lens array is inefficient.

SUMMARY OF THE INVENTION

A lens array having corrective measures is disclosed. The lens array includes a substrate. A plurality of primary lenses are formed from the substrate. A corrective measure is formed for each primary lens having a uniformity error such that the corrective measure corrects the uniformity error.

A method of fabricating a lens array is disclosed. A plurality of primary lenses are formed from a first side of a substrate. A uniformity of the plurality of primary lenses are measured. A corrective measure is formed for each primary lens having a uniformity error based on the measured uniformity such that the corrective measure corrects the uniformity error.

Other features and advantages of the present invention will be apparent from the accompanying drawings, and from the detailed description, which follows below.

BRIEF DESCRIPTION OF THE DRAWINGS

The present invention is illustrated by way of example and not limited in the figures of the accompanying drawings in which like references indicate similar elements and in which.

DETAILED DESCRIPTION

A lens array having corrective measures is described. The lens array includes a substrate. A plurality of primary lenses are formed from the substrate. A corrective measure is formed for each primary lens having a uniformity error such that the corrective measure corrects the uniformity error.

The corrective measures described herein correct for lens array uniformity errors such as focal position errors, focal distance errors, or other lens aberration errors. The corrective measures correct for errors in position of fibers in a fiber array. The corrective measures are formed selectively to provide correction for only those lenses having a uniformity error. Such corrective measures may be used to correct for uniformity errors in optical switching systems.

A method of fabricating a lens array is described. A plurality of primary lenses are formed from a first side of a substrate. A uniformity of the plurality of primary lenses are measured. For example, the absolute position uniformity may be measured or the position uniformity relative to a fiber block may be measured. A corrective measure is formed for each primary lens having a uniformity error based on the measured uniformity such that the corrective measure corrects the uniformity error.

The methods described herein form corrective measures to correct uniformity errors for lenses. The methods described herein also provide simple processes for fabricating corrective measures, which do not require ultra precise control of the lens fabrication. Furthermore, remaking a lens array having lenses with uniformity errors is not required. Instead corrective measures may be formed to correct for such uniformity errors.

Figure 1:
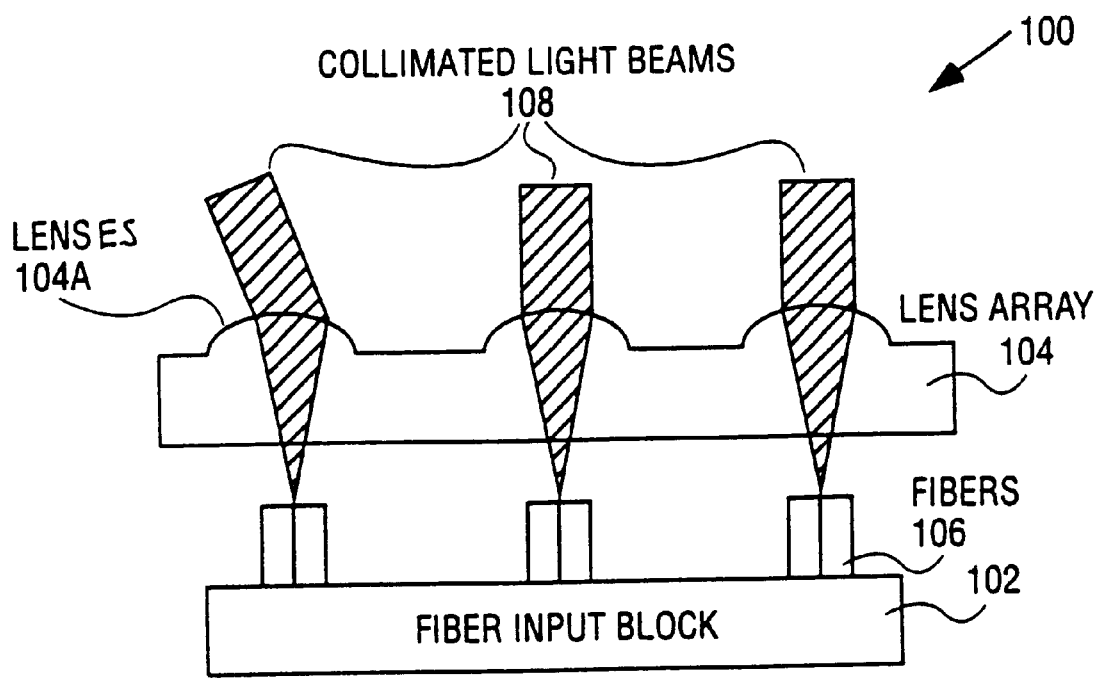
FIG. 1 illustrates a prior art lens array.
Figure 2:
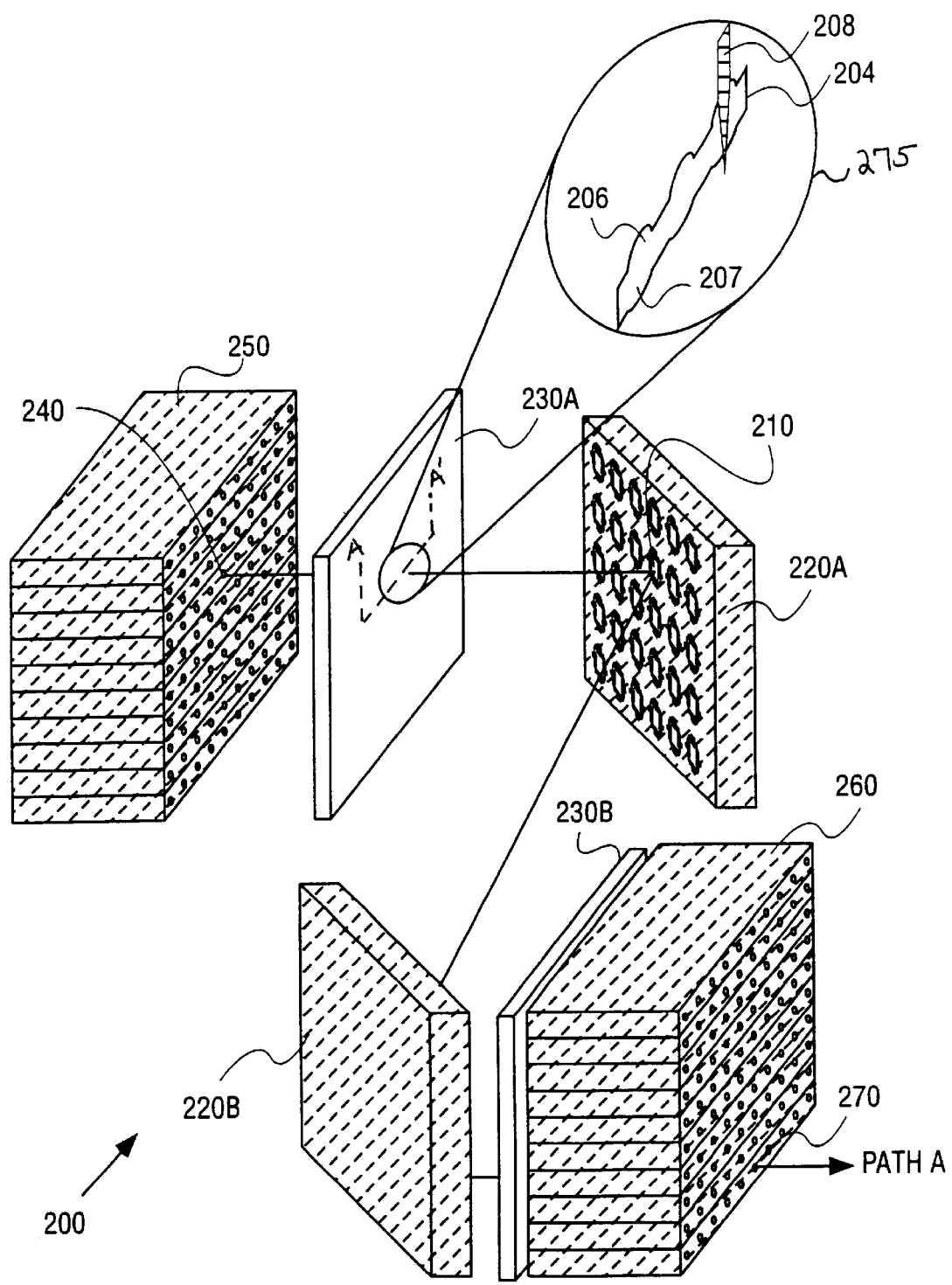
FIG. 2 illustrates an exemplary optical switching system for practicing the invention.

FIG. 2 illustrates an exemplary optical switching system 200 for practicing the invention. For example, optical switching system 200 may represent a 3-dimensional optical switching system. A 3-dimensional optical switching system allows for optical coupling between input fibers and output fibers in different planes using lens arrays and mirror arrays. The lens arrays and mirror arrays provide proper angle and position of light beams traveling from input fibers to output fibers. That is, a light beam must leave and enter a fiber in a direct path. In the following description of FIG. 2, mirror arrays are described as micro-electro-mechanical-system (MEMS) mirror arrays. MEMS mirror arrays are arrays of microscopic mirror devices formed with a substrate using integrated (IC) fabrication techniques. The mirror devices can redirect beams of light to varying positions.

Referring to FIG. 2, optical switching system 200 includes input fiber array 250, first lens array 230A, first MEMS mirror array 220A, second MEMS mirror array 220B, second lens array 230B, and output fiber array 260.

Input fiber array 250 provides a plurality of optical fibers 240 for transmitting light to first lens array 230A. First lens array 230A includes a plurality of optical lenses, which are used to direct collimated beams of light from input fiber array 250 to individual MEMS mirror devices 210 on MEMS mirror array 220A.

A blown up view 275 of a cross-sectional side view (rotated by 90 degrees for purposes of illustration) of a portion of first lens array 230A along the line A–A' is shown in FIG. 2. First lens array 230A and second lens array 230B may include a lens array 204 having primary lenses 206 with corresponding correction measures. For example, correction lenses 207 may be formed on a bottom side of lens array 204 that may correct for focal position and focal distance errors associated with primary lenses 206. Thus, the combination of primary lenses 206 and correction lenses 207 allow first lens array 230A to direct accurately collimated beams of light 208. Second lens array 230B may also include the same type of lens array 204 having primary lenses 206 and correction lenses 207. As such, first lens array 230A and second lens array 230B are capable of forming collimated light beams 208 and directing accurately light beams 208 to desired locations. Alternatively, first lens array 230A and second lens array 230B may include different types of correction measures to correct for uniformity errors such as focal position and focal distance errors for primary lenses 206. For example, lens array 204 may include various types of correction measures as illustrated in FIGS. 3 through 6. Furthermore, lens array 204 may operate with a correction lens array as illustrated in FIG. 7.

MEMS mirror array 220A includes a plurality of electrically addressable MEMS mirror devices 210. For example, MEMS mirror device 210 may be a gimbaled mirror device having a rectangular, elliptical, or circular shape. MEMS mirror device 210 may have other shapes or configurations to redirect beams of light. The plurality of MEMS mirror devices 210 for MEMS mirror array 220A can pivot a mirror component to redirect or reflect beams of light to varying MEMS mirror devices on second MEMS mirror array 220B. Second MEMS mirror array 220B also includes a plurality of MEMS mirror devices such as a MEMS mirror device 210, which are used to redirect and reflect light beams to varying lenses on second lens array 230B. Second lens array 230B accepts collimated light beams from second MEMS mirror array 220B and focuses the light beams to individual output fibers 270 of output fiber array 260.

Optical switching system 200 allows light beams from any input fiber 240 of input fiber array 250 to be redirected to any output fiber 270 of output fiber array 260 by changing the angle of mirrors 210 in mirror arrays 220A and 220B. For example, a light beam following the path "A" is outputted from one input fiber and is redirected using first lens array 230A, second lens array 230B, and MEMS mirror arrays 220A and 220B to a different output fiber. The lens arrays and MEMS mirror arrays may also be used in scanning systems, printing systems, display systems, and other systems that require redirecting beams of light.

Figure 3:
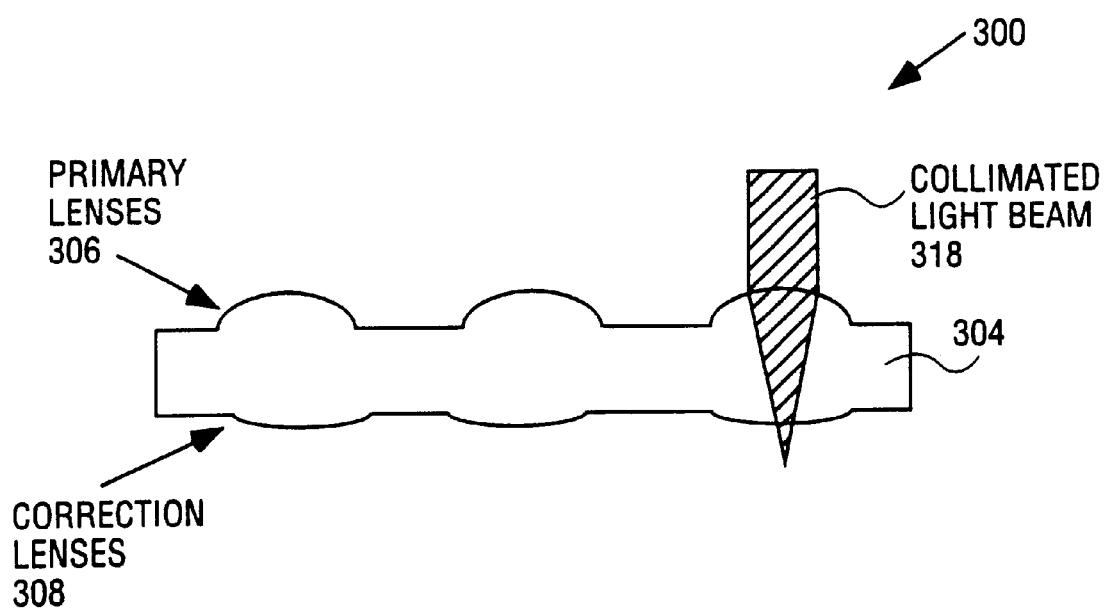
FIG. 3 illustrates a cross-sectional side view of one embodiment of a lens array having correction lenses.

FIG. 3 depicts an illustration 300 of a cross-sectional side view of one embodiment of a lens array having correction lenses. Referring to FIG. 3, a lens array 304 is shown having primary lenses 306 formed on a first side and correction lenses 308 formed on a second side. For purposes of illustration, the first side is a topside of lens array 304 and the second side is bottom side of lens array 304. In addition, for purposes of illustration, primary lenses 306 in FIG. 3 are shown having focal position uniformity errors thus requiring correction lenses 308. Correction lenses 308 are formed on the bottom side of lens array 304 to correct for uniformity errors related to primary lenses 306. Alternatively, correction lenses 308 may be formed on a separate substrate.

Primary lenses 306 may include lenses that do not receive light beams in the center of the lens thus causing a focal position error. To correct for focal position error (an angular error of light beams leaving primary lenses 306), correction lenses 308 on the bottom side of lens array 304 may have different positions relative to input light beams passing through primary lenses 306. As such, correction lenses 308 may compensate for differences in relative position between each fiber and each primary lens. For example, light beams may enter primary lenses 306 off center. Correction lenses 308 may be formed off center in the other direction with respect to primary lenses 306 to correct for the focal position error of light beams passing through primary lenses 306.

Figure 4:
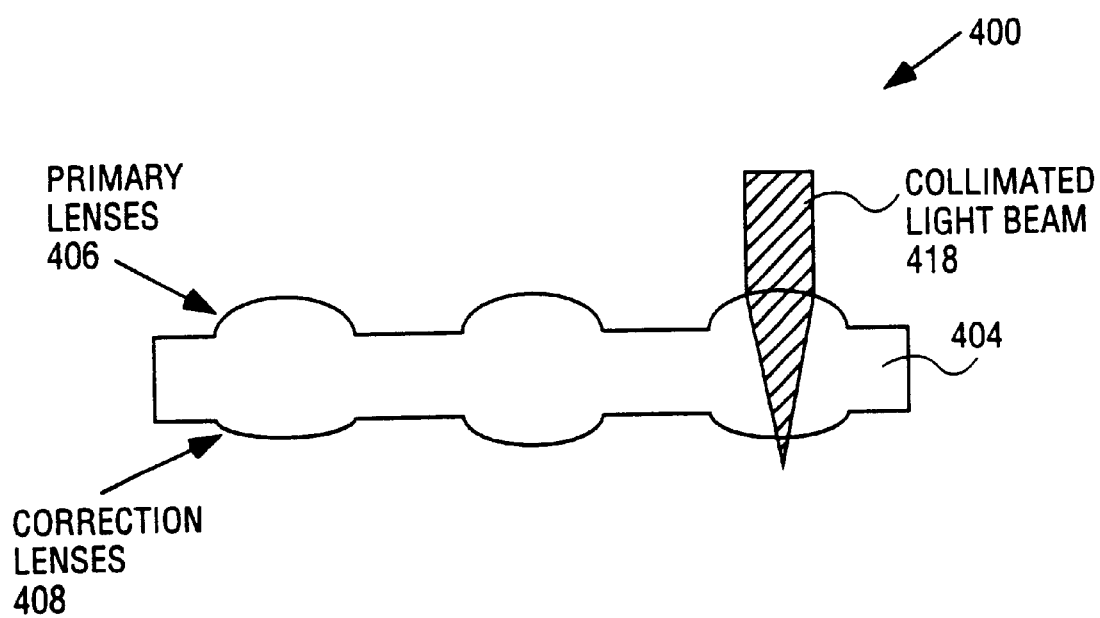
FIG. 4 illustrates a cross-sectional side view of another embodiment of a lens array having correction lenses.

FIG. 4 depicts an illustration 400 of a cross-sectional side view of one embodiment of a lens array having correction lenses. Referring to FIG. 4, primary lenses 406 have variations in curvature resulting in variations in the focal lens, which causes convergence or divergence of if not corrected by a correction lens. Thus, as shown in FIG. 4, the primary lens having a collimated light beam 418 passing through it has the correct curvature, and the corresponding correction lens has a nominal curvature designed to give the desired beam shape when used with a properly fabricated primary lens. The primary lens at the center of lens array 404 has too little curvature that would produce a diverging beam when used with a nominal correction lens. Thus, the corresponding correction lens has increased curvature to compensate the reduced curvature of the primary lens. The primary lens at the left of lens array 404 has too much curvature that would result in a diverging beam when used with a correction lens of the nominal curvature. Thus, the corresponding correction lens at the left has reduced curvature to produce a collimated beam. Collimated light beam 418 may be adjusted by a correction lens 408 underneath a primary lens to correct for the focal distance errors.

The primary and correction lenses are designed to be concave in the examples as shown in FIG. 4. For example, the focal length of a primary lens is chosen so that it will produce a collimated beam only when used with a concave correction lens. The primary lens could be designed instead to collimate the beam without any correction lens. In that case, the nominal correction lens used with an ideal primary lens would be flat. A primary lens with too little curvature may be compensated by a concave correction lens. A primary lens with too much curvature may be compensated by a convex correction lens.

Alternatively, correction lenses 408 may be a combination of off centered correction lenses having varying curvatures to offset and compensate for focal position and focal distance areas of primary lenses 406. Furthermore, primary lenses 406 may not require correction lenses if primary lenses 406 do not have uniformity errors.

Figure 5:
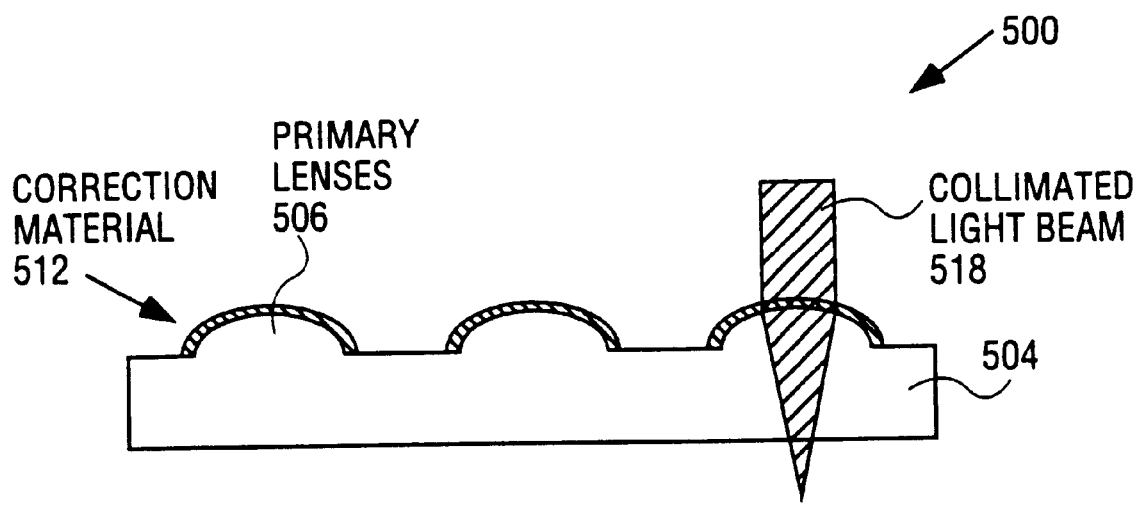
FIG. 5 illustrates a cross-sectional side view of one embodiment of a lens array having correction material.

FIG. 5 depicts an illustration 500 of a cross-sectional side view of one embodiment of a lens array having correction material. Referring to FIG. 5, lens array 504 is shown having primary lenses 506 formed on a topside of lens array 504. In addition, correction material 512 is formed on primary lenses 506. Correction material 512 may correct for focal distance errors and focal position errors related to primary lenses having such uniformity errors. The correction material 512 may include a non-light absorbing material such as silicon, glass, silicon nitride, or silicon dioxide. For one embodiment, adjustment of the primary lenses may be accomplished by adding correction material to the primary lenses.

Correction material 512 is deposited selectively based on the characterization of primary lenses 506. For example, if the curvature of the primary lens array is slightly off center, correction material 512 may be added selectively to compensate for such error. That is, correction material 512 may be added to adjust the center of primary lens 506. Furthermore, correction material 512 may be added to adjust the curvature of primary lenses 506. For example, if collimated light beam 518 focal distance was too long as a result of small curvature for a lens for primary lenses 506, correction material 512 may be added to increase the curvature of a lens for primary lenses 506. For one embodiment, correction material 512 may be added using a focused ion beam (FIB) process.

Figure 6:
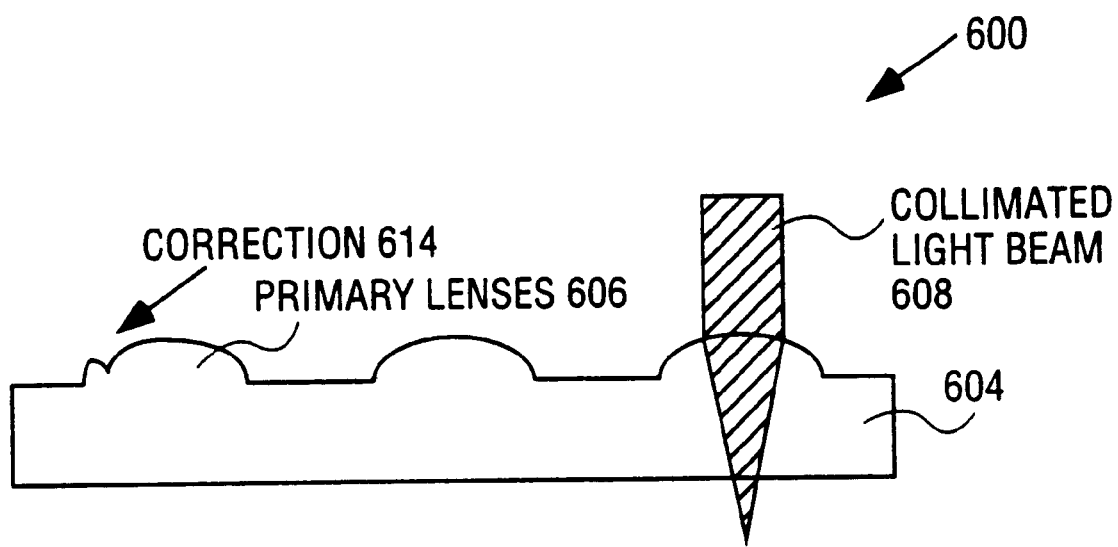
FIG. 6 illustrates a cross-sectional side view of one embodiment of a lens array having altered shaped lenses.
Figure 7:
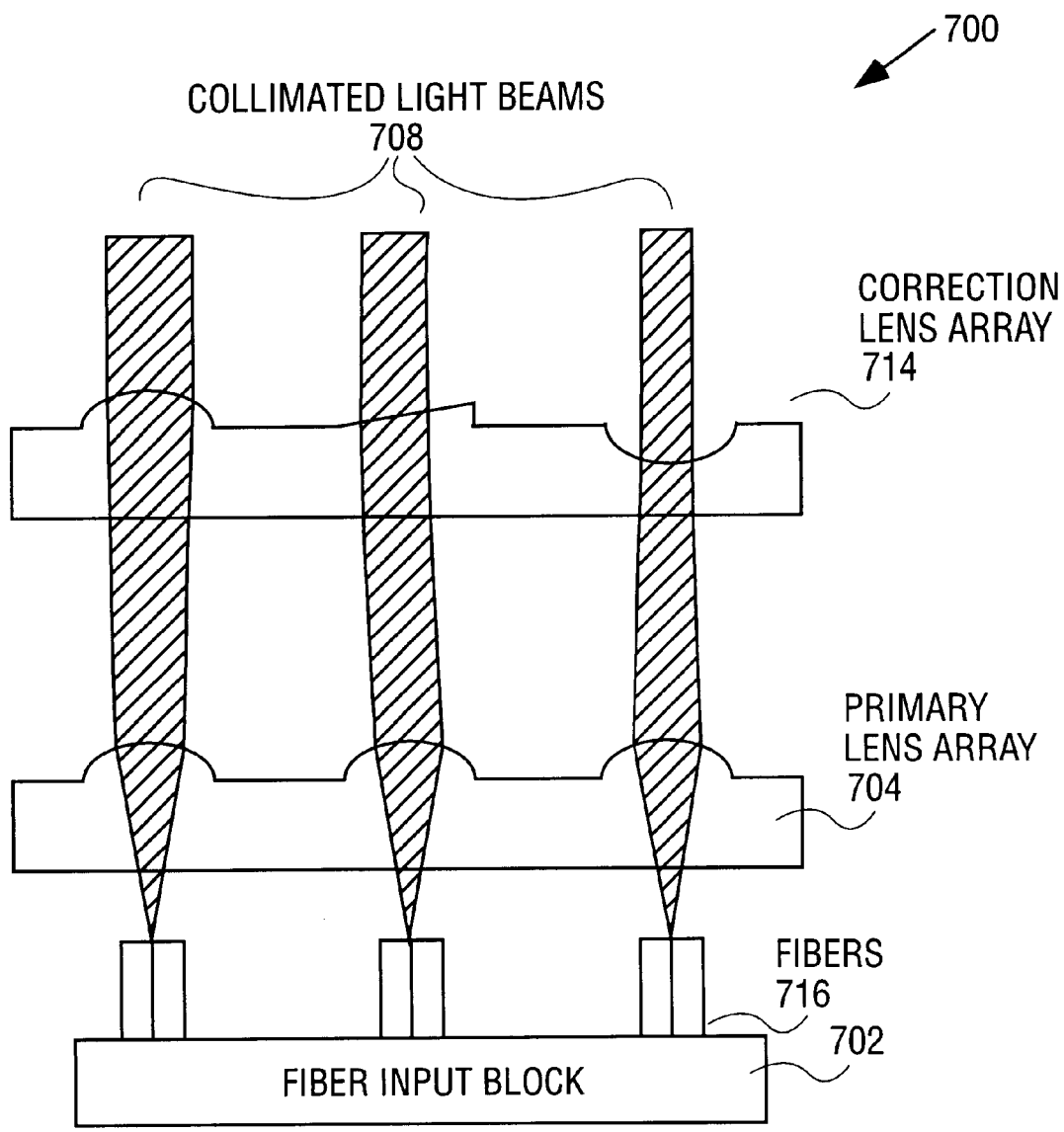
FIG. 7 illustrates a cross-sectional side view of one embodiment of a lens array and a correction lens array.

FIG. 6 depicts an illustration 600 of one embodiment of a lens array having an altered shaped lens. Referring to FIG. 6, lens array 604 is shown having primary lenses 606 formed on a topside of lens array 604. As shown in FIG. 6, portions of a primary lens is removed to provide a correction 614 for focal position or focal distance error. For example, if the shape of the curvature of primary lens 606 is deformed, portions of the primary lens 606 may be removed using, for example, a focused ion beam process, to correct for the incorrect shape. A collimated light beam 608 may pass through a lens having correction 614 such that uniformity errors are corrected for the collimated light beam 608.

FIG. 7 depicts an illustration 700 of one embodiment of a primary lens array 704 with a corresponding correction lens array 714. Referring to FIG. 7, primary lens array 704 is followed by correction lens array 714. Alternatively, correction lens array 714 may precede primary lens array 704 with respect to fibers 716 of fiber input block 702. Three types of lens correction are illustrated for primary lens array 704 in FIG. 7. The lens errors are exaggerated for clarity. In the example on the left, the primary lens has a radius of curvature that is too large resulting in a diverging beam. The corresponding correction lens of correction lens array 714 is also concave to produce a collimated beam. In the example in the center, the primary lens has the correct focal length, but the beam is directed at an angle due to a position error between the lens and the fiber. In this case, the corresponding correction lens of correction lens array 714 is approximately flat but tilted. This tilted surface causes the light to be refracted at an angle based on Snell's law. In the example at the right, the primary lens has too short of a focal length corresponding to a radius of curvature that is too small. In this instance, a corresponding concave correction lens of correction lens array 714 is used to produce a collimated beam.

Figure 8:
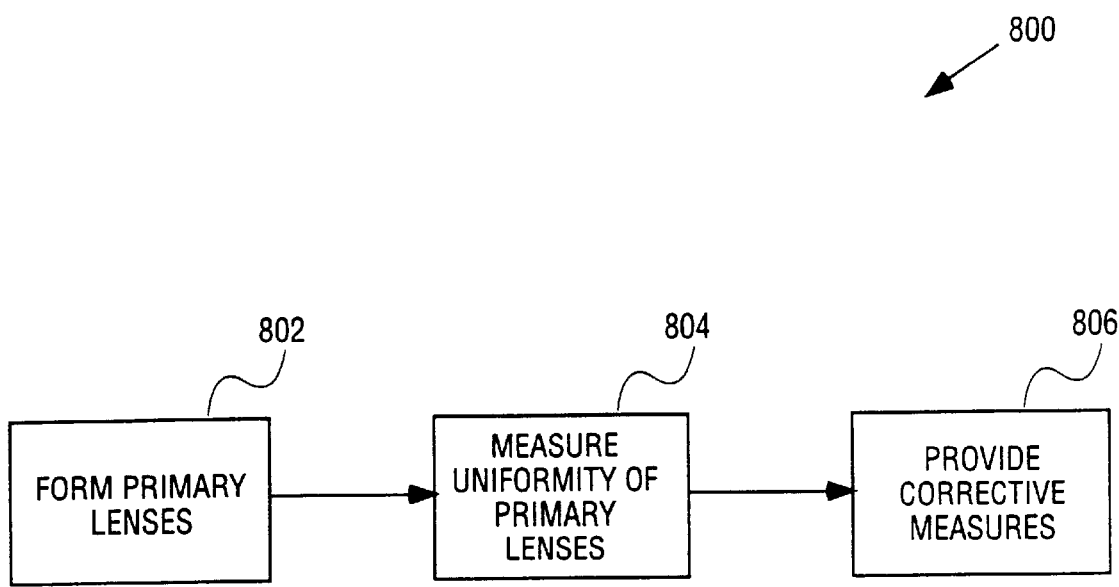
FIG. 8 illustrates a flow diagram of one embodiment of an operation for providing corrective measures for a lens array.

FIG. 8 is a flow diagram 800 of one embodiment of an operation for providing corrective measures to a lens array. Initially, at operation 802, primary lenses are formed for a lens array.

At operation 804, the uniformity of the primary lenses are measured to determine any uniformity errors. For example, primary lenses may be measured for focal distance, focal position, intensity of light passing through the lenses, angle of beams of light passing through the lenses, and level of collimation of the light beams. Each lens array is tested with a corresponding fiber array or other measurement apparatus to determine the difference between the desired lens characteristics and actual lens characteristics.

At operation 806, lens corrections are then designed and fabricated for each individual primary lens having a uniformity error. That is, corrective measures such as those illustrated in FIGS. 3 through 7 may be formed for those primary lens array having uniformity errors. For example, a substrate may be selectively patterned to form corrective measures with the primary lenses.

Figure 9A:
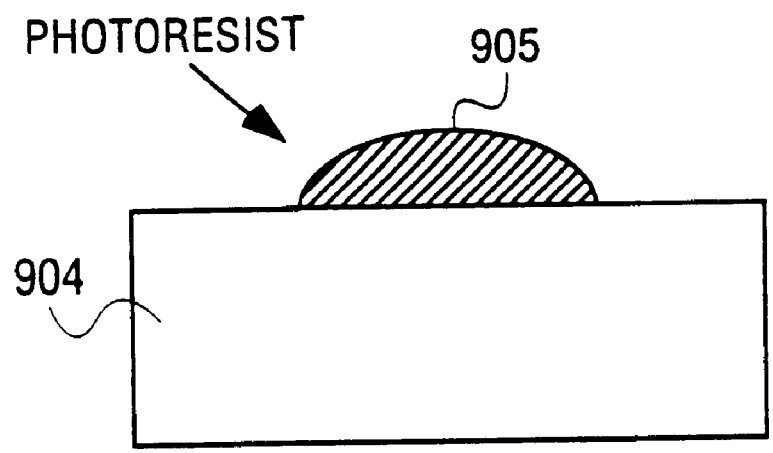
FIGS. 9A through 9B are cross-sectional side views illustrating a process for fabricating a lens array having correction measures according to one embodiment.
Figure 9B:
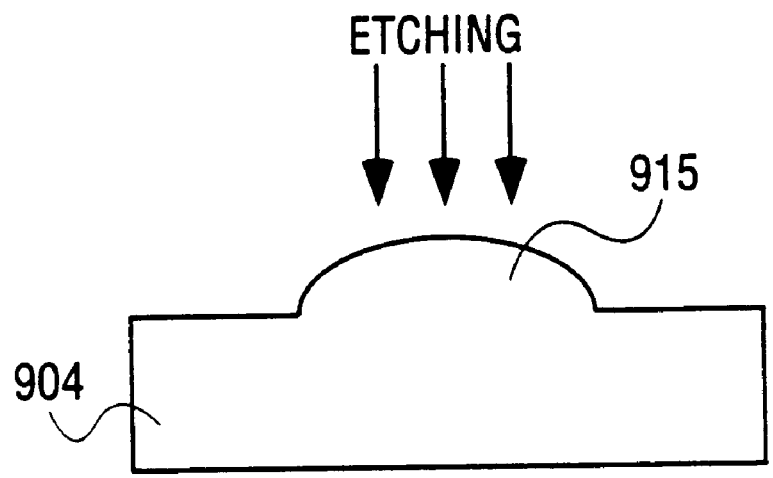

FIGS. 9A through 9B are cross-sectional side views illustrating a process for fabricating a lens array with correction lenses according one embodiment. The following process may be used for making both primary lenses and correction lenses. For purposes of illustration, the following processing steps are related to forming correction lenses after the primary lenses have been tested for uniformity errors. Thus, the following process is related to forming correction lenses to correct for measured uniformity errors.

Referring to FIG. 9A, a uniform layer of photoresist 905 is formed on substrate 904 and shaped selectively. Substrate 904 may be a glass, silicon, gallium arsenide, or indium phosphide substrate. Photoresist 905 is then formed into a desired shape. For example, a gray-scale mask may be used to shape selectively photoresist 905 for a desired shape. Photoresist 905 may be shaped using the gray-scale mask such that light exposure varies across the photoresist and the developing rate varies as well which affects the etching rate for substrate 904. Alternatively, photoresist 905 may be shaped selectively by forming photoresist patterns of uniform height. The photoresist patterns are then applied with heat, and then surface tension is used to cause the photoresist patterns to flow to a desired shape.

Referring to FIG. 9B, the shape of photoresist 905 is transferred to substrate 904 by using a directional etch that removes photoresist 905 while simultaneously etching substrate 904. As such, the shape of photoresist 905 dictates the shape of a lens. The thusly formed correction lens 915 provides for uniformity error correction based on its curvature and position on substrate 904. That is, correction lens 915 may correct for a primary lens having a higher curvature by being formed with a photoresist 905 having a smaller curvature. Furthermore, the position of photoresist 905 may dictate the position of correction lens 915 with respect to a primary lens to correct for focal position errors. For one embodiment, the thusly formed lens may be a primary lens, which has been tested for a uniformity error. Thus, a correction material can be formed selectively on the lens to correct for a particular uniformity error of the lens as explained above with respect to FIG. 5.

Figure 10A:
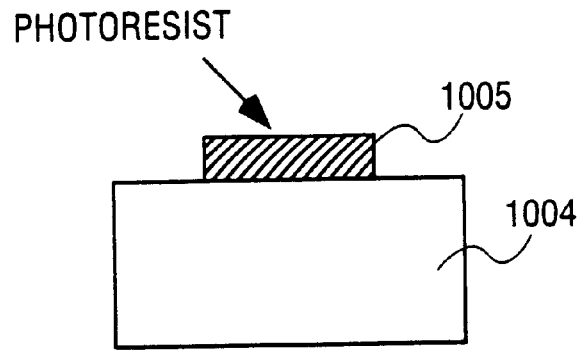
FIGS. 10A through 10C are cross-sectional side views illustrating a process for fabricating a lens array having correction measures according to a second embodiment.
Figure 10B:
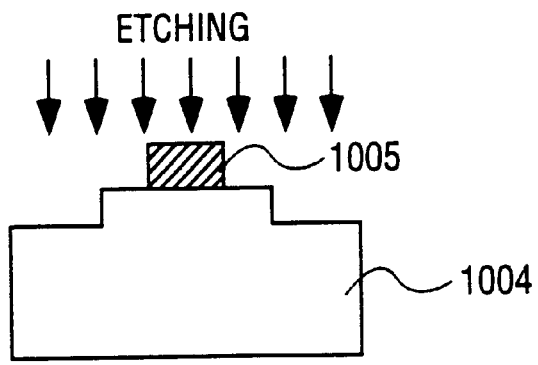
Figure 10C:
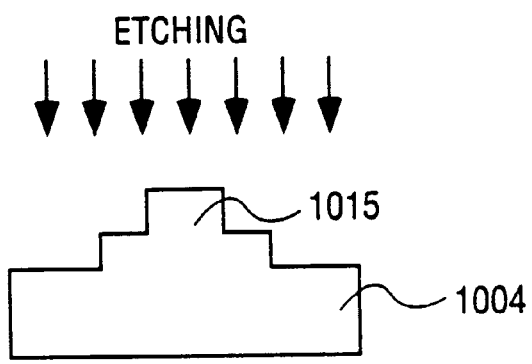

FIGS. 10A through 10C are cross-sectional side views illustrating a process for fabricating a lens array having correction measures according to a second embodiment. The following process may be used for making both primary lenses and correction lenses. For purposes of illustration, the following processing is related to forming correction lenses after the primary lenses have been tested for uniformity errors. Thus, the following process is are related to forming correction lenses to correct for measured uniformity errors.

The following process may form primary lenses or correction lenses by removing portions of substrate 1004 in steps having heights of sub-multiples of half of the optical wavelength in the material ($\lambda/2$). This technique produces Fresnel lenses in the limit of a large number of phase steps.

Referring to FIG. 10A, photoresist is formed on substrate 1004 and selectively patterned to form photoresist pattern 1005. The position and shape of photoresist pattern 1005 determines the position and shape of a primary or correction lens.

Referring to FIG. 10B, substrate 1004 is etched to form steps. The photoresist pattern is removed and new photoresist is formed on substrate 1004 and selectively patterned to form a new photoresist pattern 1005 on the top step. The new photoresist pattern is different than the former such that steps are formed in substrate 1004.

Figure 11A:
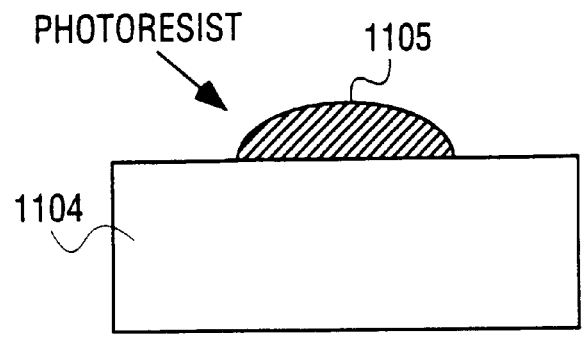
FIGS. 11A through 11C are cross-sectional side views illustrating a process for fabricating a lens array having correction measures according to a third embodiment.
Figure 11B:
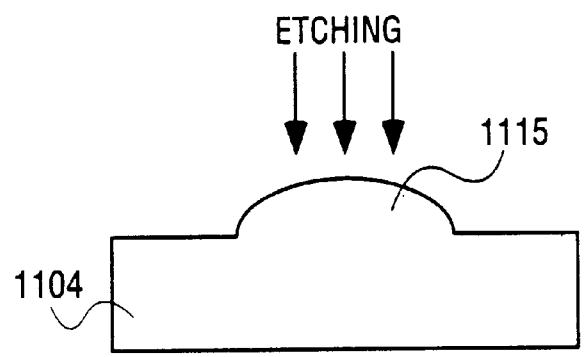
Figure 11C:
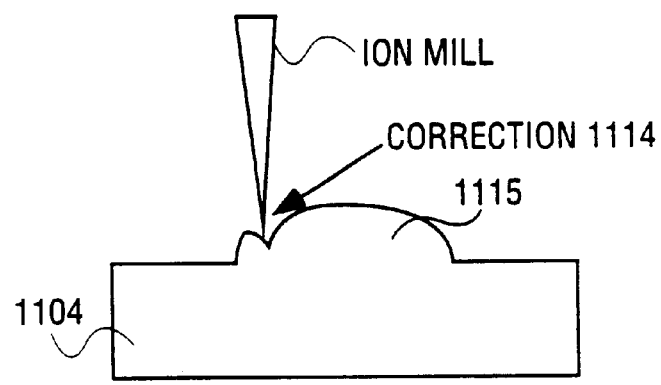

Referring to FIG. 10C, substrate 1004 is etched to form more steps. This process continues until a desired shape is formed. The thusly formed lens 1015 is shaped by etching small steps using varying sizes of photoresist pattern. Lens 1015 may be a correction lens for correcting a primary lens having a high curvature by being formed with steps outlining a small curvature. Furthermore, the position of photoresist pattern 1005 may dictate the position of correction lens 1015 with respect to a primary lens to correct for focal position errors. FIGS. 11A through 11C are cross-sectional side views illustrating a process for fabricating a lens array with correction measures according to a third embodiment. The following process may be used for making both primary lenses and correction lenses. For purposes of illustration, the following process is related to forming primary lenses and altering the shape of those primary lenses having uniformity errors. Thus, the following process is related to forming primary lenses and altering its shape to correct for measured uniformity errors.

Initially, the fabrication process illustrated in FIGS. 11A and 11B to form lens 1115 from substrate 1104 and photoresist 1105 are identical to the fabrication process illustrated by FIGS. 9A and 9B to form lens 915 from substrate 904 and photoresist 905 and accordingly description to FIGS. 11A and 11B will be omitted.

Referring to FIG. 11C, portions of the topside of primary lens 1115 are removed using an ion milling process. For an ion milling process, top portions of substrate 1104 are bombarded selectively with focused ion beams (FIB) to remove portions of the primary lens 1115. Alternatively, an ion-milling process may be used to shape a lens from substrate 1104 without implementing the process as illustrated in FIGS. 11A and 11C.

The resolution of the ion-milling beam is on the order of 5–100 nm. The beam size can be reduced at the expense of increased etch time. The ion-milling process may use Gallium (Ga) atoms. Furthermore, the ion-milling process rate may be increased by depositing a material that can be removed more quickly such as silicon dioxide ($SiO_2$). The lens correction may also be monitored in order to obtain optimum lens correction.

The thusly fabricated lens 1115 may be shaped selectively to provide correct curvature and center to compensate for focal position and focal distance errors. Alternatively, correction lenses may be reshaped using an ion milling process to correct for uniformity errors.

A combination of the processes illustrated in FIGS. 9A through 9B, 10B through 10C, and 11A through 11C may be used to form a correction lens array 714 as shown in FIG. 7. For example, the far left correction lens of correction lens array 714 may use the process illustrated in FIGS. 9A through 9B or the process illustrated in FIGS. 10A through 10C. Also, the center correction lens of correction lens array 714 may be formed using a focused ion beam process to alter the shape of a substrate. Furthermore, the right correction lens of correction lens array 714 may also use a focused ion beam process to etch away a portion of a substrate to provide a concave indentation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A lens array, comprising:
   a plurality of primary lenses, each formed from a single substrate, at least some lenses of the plurality of primary lenses having a uniformity error; and
   a corrective measure for each primary lens having a uniformity error, the corrective measure correcting the uniformity error.

2. The lens array of claim 1, wherein the substrate is one of a silicon, glass, gallium arsenide and indium phosphide substrate.

3. The lens array of claim 1, wherein the uniformity error comprises at least one of a focus angle error and a focus position error.

4. The lens array of claim 1, wherein the corrective measure includes a corrective lens for each primary lens having a uniformity error such that the corrective lens corrects the uniformity error.

5. The lens array of claim 4, wherein the corrective lenses are formed on an opposite side of the substrate of the primary lenses.

6. The lens array of claim 4, wherein the corrective lenses are formed from a separate substrate from the primary lenses.

7. The lens array of claim 1, wherein the corrective measure includes a correction material formed on each primary lens having a uniformity error such that the correction material corrects the uniformity error.

8. The lens array of claim 7, wherein the correction material includes silicon, silicon dioxide, or silicon nitride.

9. The lens array of claim 1, wherein the corrective measure comprises an alteration to the shape of a primary lens having a uniformity error such that the alteration corrects the uniformity error.

10. A method of fabricating a lens array, the method comprising:
   forming a plurality of primary lenses from a first side of a substrate;
   measuring the uniformity of the plurality of primary lenses; and
   forming corrective measures for each primary lens having a uniformity error based on the measured uniformity.

11. The method of claim 10, wherein forming a plurality of primary lenses includes forming a plurality of primary lenses from a first side of at least one of a silicon, glass, gallium arsenide, and indium phosphide substrate.

12. The method of claim 10, wherein measuring the uniformity includes measuring focal position and focal length for each primary lens.

13. The method of claim 10, wherein forming corrective measures includes forming a corrective lens for each primary lens having a uniformity error on a second side of the substrate such that the corrective lens corrects the uniformity error.

14. The method of claim 10, wherein forming corrective measures includes forming the corrective measures from a different substrate from the primary lenses.

15. The method of claim 13, wherein forming a corrective lens includes forming a corrective lens for each primary lens having at least one of a focal position and focal distance uniformity error on a second side of the substrate.

16. The method of claim 10, wherein forming corrective measures includes forming a correction layer on each primary lens having a uniformity error.

17. The method of claim 16, wherein forming a correction layer includes forming a correction layer on each primary lens having at least one of a focal position and a focal distance uniformity error.

18. The method of claim 1, wherein forming corrective measures includes removing portions of the each primary lens having a uniformity error to correct for the uniformity error.

19. A method of altering a shape of a lens, the method comprising:
   forming a plurality of primary lenses for collimating light beams;
   measuring a uniformity of the plurality of the primary lenses; and
   removing portions of each primary lens having a uniformity error based on the measured uniformity such that the reshaped primary lens corrects for the uniformity error.

20. The method of claim 19, wherein removing portions includes removing portion of the primary lens using an ion milling process.

21. The method of claim 20, wherein Gallium ions are used in the ion milling process.

22. An apparatus comprising:
   one or more input fiber arrays for outputting light beams;
   one or more output fiber arrays for receiving outputted light beams from the one or more input fiber arrays;
   one or more primary input lens arrays having lenses for collimating the light beams from the one or more input fiber arrays, at least some lenses of the one or more primary input lens arrays having a uniformity error;
   one or more primary output lens arrays having lenses for collimating the light beams from the one or more primary input lens arrays, at least some lenses of the one or more plurality of primary lenses having a uniformity error;
   movable mirrors for directing light from the one or more primary input lens arrays to the one or more primary output lens arrays; and
   correction measures for correcting uniformity errors for the at least a portion of the lenses having a uniformity error of one or more primary input and output lens arrays.

23. A fiber optic switching system, comprising:
   an input fiber array for outputting light beams from each of a plurality of fibers of the array;
   an output fiber array for receiving outputted light beams at each of a plurality of fibers of the output fiber array from the fibers of the input fiber array;
   a primary input lens array having a plurality of lenses, one for each input fiber, for collimating the light beams from the respective input fibers, at least some lenses of the primary input lens array having a uniformity error;
   a primary output lens arrays having a plurality of lenses, one for each output fiber, for collimating the light beams from the primary input lens array into the respective output fiber, at least some lenses of the primary output lens array having a uniformity error;
   movable mirrors for directing light from primary input lens array to the primary output lens array to effect switching of the light to different output fibers; and
   a corrective measure for at least a portion of the lenses having a uniformity error, the corrective measure correcting the uniformity error.

24. The lens array of claim 23, wherein the uniformity error comprises at least one of a focus angle error and a focus position error.

25. The lens array of claim 23, wherein the corrective measure includes a corrective lens for each primary lens having a uniformity error such that the corrective lens corrects the uniformity error.

26. The lens array of claim 25, wherein the lens arrays are formed on one side of a substrate and wherein the corrective lenses are formed on an opposite side of the substrate.

27. The lens array of claim 25, wherein the lens arrays are formed on one side of a substrate and wherein the corrective lenses are formed from a second substrate.

28. The lens array of claim 23, wherein the corrective measure includes a correction material formed on each lens having a uniformity error such that the correction material corrects the uniformity error.

29. The lens array of claim 23, wherein the corrective measure comprises an alteration to the shape of a lens having a uniformity error such that the alteration corrects the uniformity error.

* * * * *